United States Patent
Otto et al.

(10) Patent No.: US 6,520,717 B1
(45) Date of Patent: Feb. 18, 2003

(54) WALKING BEAM ROLLER APPARATUS

(76) Inventors: Allan Otto, P.O. Box 447, Big Sandy, MT (US) 59520; Jerry Otto, 9500 Rd. 710 W., Havre, MT (US) 59501

( * ) Notice: Subject to any disclaimer, the term of this patent is extended or adjusted under 35 U.S.C. 154(b) by 0 days.

(21) Appl. No.: 09/287,968

(22) Filed: Apr. 7, 1999

(51) Int. Cl.$^7$ ................................................ E01C 19/23
(52) U.S. Cl. ...................................... 404/122; 404/132
(58) Field of Search ................................ 404/122, 128, 404/124, 127, 125, 126, 102, 131, 132

(56) References Cited

U.S. PATENT DOCUMENTS

| | | | | |
|---|---|---|---|---|
| 118,616 A | * | 8/1871 | Kelly | 404/122 |
| 1,102,448 A | * | 7/1914 | Schamell | 404/128 |
| 1,238,497 A | * | 8/1917 | Connelly | 404/122 |
| 1,320,533 A | * | 11/1919 | Cull | 404/128 |
| 2,407,965 A | * | 9/1946 | Smith | 404/122 |
| 2,624,251 A | * | 1/1953 | Porter | 404/122 |
| 3,291,013 A | * | 12/1966 | Stolp | 404/128 |
| 3,291,014 A | * | 12/1966 | Paramythioti | 404/122 |
| 3,401,611 A | * | 9/1968 | Schneider | 404/128 |
| 3,426,660 A | * | 2/1969 | Scott | 404/117 |
| 3,993,413 A | * | 11/1976 | Cox et al. | 404/128 |
| 4,157,877 A | * | 6/1979 | Lee | 404/128 |
| 4,802,790 A | * | 2/1989 | Tondini | 404/122 |
| 4,909,663 A | * | 3/1990 | Freeman | 404/128 |
| 5,395,182 A | * | 3/1995 | Rossburger | 404/122 |
| 6,119,792 A | * | 9/2000 | Almer | 172/799.5 |

* cited by examiner

Primary Examiner—Gary S. Hartmann
Assistant Examiner—Alexandra K. Pechhold
(74) Attorney, Agent, or Firm—Burkhart & Burkhart; Anne K. Burkhart; Patrick N. Burkhart

(57) ABSTRACT

A roller assembly including a frame member, a plurality of front roller members, and plurality of rear roller members corresponding in number to the plurality of front roller members is described. A plurality of walking beams are pivotably connected to the frame member. Each of the walking beams connects one of the front roller members with a respective one of the rear roller members. The front roller members and the rear roller members have respective radial axes. The front and rear roller members are mounted on the walking beams such that the radial axes of the front roller members are offset from the radial axes of the rear roller members. The frame member can include a generally rectangular outer frame, which can be fabricated from tubular steel. An attachment mechanism can be secured to the frame member to facilitate attachment of the roller assembly to an operating tow vehicle. A hitch mechanism can be secured to the frame member to facilitate attachment of the roller assembly to a second vehicle. The attachment mechanism and the hitch mechanism can be secured on opposite sides of the frame member. The front roller members and the rear roller members can be provided as wheel and tire assemblies mounted to the walking beams by means of lubricated bushings. At least one reinforcing beam can be secured to the frame member. In an embodiment, a pair of parallel reinforcing beams are secured at a central portion of the frame member. At least one of the roller members can be mounted between the reinforcing beams.

20 Claims, 3 Drawing Sheets

WALKING BEAM ROLLER APPARATUS

CROSS-REFERENCE TO RELATED APPLICATIONS

None

STATEMENT AS TO RIGHTS TO INVENTIONS MADE UNDER FEDERALLY-SPONSORED RESEARCH AND DEVELOPMENT

None

FIELD OF THE INVENTION

The invention relates generally to rollers. In particular, the invention relates to rollers used in conjunction with road construction apparatus.

DESCRIPTION OF RELATED ART

Paved roads or pathways predate the dawn of written history. Early civilizations sometimes used loose material such as gravel or small stones as paving materials. Such materials represented an enormous advancement from worn earthen trails that were alternatively muddy quagmires during rainy seasons and hard ribbons of choking dust otherwise.

Today, materials such as gravel are still used as paving material, either alone or as a base material for other surfaces such as asphalt and concrete. The quality and durability of the finished paving requires that the base layers be compacted to provide a relatively uniform base surface. This is typically accomplished in road construction by first grading the material, then using compaction devices known as rollers or packers. Rollers come in a variety of configurations, ranging from manually propelled walk-behind devices to sophisticated motorized vehicles It has also been proposed to use road construction vehicles such as graders or bulldozers to tow roller assemblies. One example of such an arrangement is described in U.S. Pat. No. 3,291,013 to Stolp. This patent is directed to a wheeled trailer type compactor in which front and rear banks of compactor wheels are independently mounted in pairs. The pairs of wheels are journaled in spring mounted shackles to permit the compactor wheels to follow ground contours.

U.S. Pat. No. 3,993,413 to Cox describes a road packer in which a plurality of pneumatic tires are mounted on shafts. A double acting cylinder is provided to lift the packer for transport, or push down on the packer during operation.

U.S. Pat. No. 4,909,663 to Freeman sets forth a road making apparatus in which a single row of roller tires is secured to a draft vehicle.

While each of these arrangements provides the advantages of dual usage for conventional construction vehicles, they have certain drawbacks in the efficacy of their rolling operation For example, known towed rollers rely upon force, applied through weights (as in Freeman) or hydraulics (as in Stolp and Cox), to achieve a uniform surface. The problems presented by irregularities in the roadbed are either not addressed, or approached with relatively complicated and largely ineffective spring suspensions as in Stolp.

It can be seen from the foregoing that the need exists for a simple, reliable arrangement for rollers that will yield a uniform paving surface despite irregularities in the roadbed.

SUMMARY

These and other objects are achieved by providing a roller assembly including a frame member, a plurality of front roller members, and plurality of rear roller members corresponding in number to the plurality of front roller members. A plurality of walking beams are pivotably connected to the frame member. Each of the walking beams connects one of the front roller members with a respective one of the rear roller members.

The front roller members and the rear roller members have respective radial axes. The front and rear roller members are mounted on the walking beams such that the radial axes of the front roller members are offset from the radial axes of the rear roller members. The frame member can include a generally rectangular outer frame, which can be fabricated from tubular steel.

An attachment mechanism can be secured to the frame member to facilitate attachment of the roller assembly to an operating tow vehicle. A hitch mechanism can be secured to the frame member to facilitate attachment of the roller assembly to a second vehicle. The attachment mechanism and the hitch mechanism can be secured on opposite sides of the frame member.

The front roller members and the rear roller members can be provided as wheel and tire assemblies mounted to the walking beams by means of lubricated bushings.

At least one reinforcing beam can be secured to the frame member. In an embodiment, a pair of parallel reinforcing beams are secured at a central portion of the frame member. At least one of the roller members can be mounted between the reinforcing beams.

The roller members can be secured to axles on the walking beams by means of respective pairs of bolt-on clamp members, thus allowing removal of the individual roller members without disassembly of any other roller assembly structure.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF A PREFERRED EMBODIMENT

Figure 1:
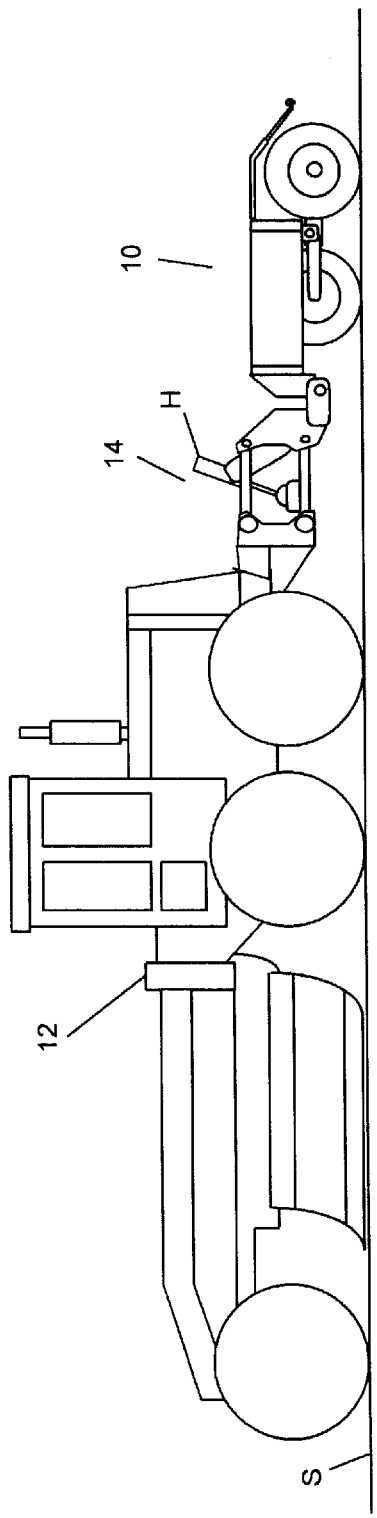
FIG. 1 is a schematic side elevational view of a roller assembly in accordance with the present invention in conjunction with a tow vehicle.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

FIG. 1 illustrates a roller assembly 10 connected to an operational towing vehicle, here illustrated as a grader 12. A connection mechanism 14 includes a hydraulic adjustment mechanism H for raising and lowering the connection assembly 14. Both the grader 12 and the connection mechanism 14 are of conventional construction. The roller assembly 10 in operation is towed behind the grader 12, and serves to compress and smooth the road surface S over which the roller assembly 10 travels.

Figure 2:
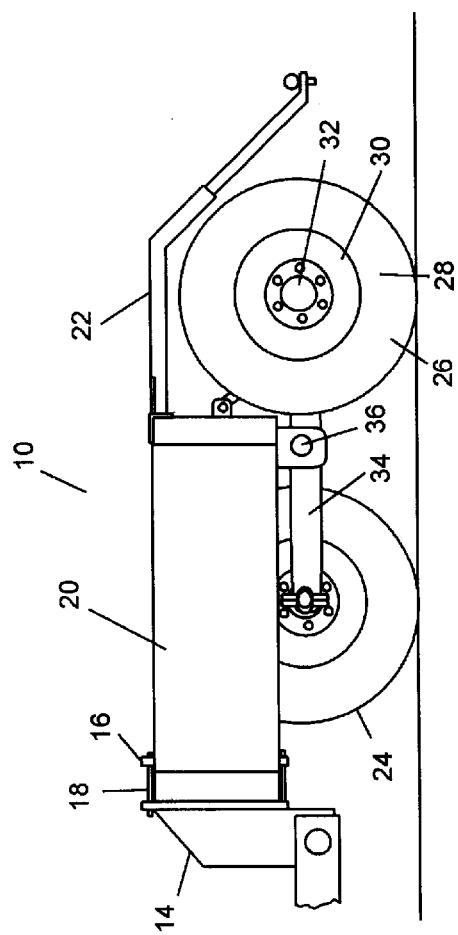
FIG. 2 schematically illustrates a detailed side elevational view of a roller assembly.

As shown in FIG. 2, the roller assembly 10 can be secured to the connection assembly 14 in any suitable manner, such as by plates 16 and bolts 18. The roller assembly 10 includes a frame member 20. A hitch mechanism 22 can be secured to the frame member 20 to facilitate connection of the roller assembly 10 to a second vehicle, such as a trailer or transport tow vehicle.

The frame 20 is supported on a plurality of front roller members 24 and rear roller members 26. The roller members 24, 26 can be provided as tire assemblies, including tires 28 mounted on rim and wheel assemblies 30, which are in turn mounted for rotation on bushings 32. Although any suitable combination of tires, wheels, rims, and bushings may be employed, it has been found that suitable results can be obtained by using TITAN Road Roller 750 tires mounted on hubs and wheels, and rims from the ARMSTRONG CO. of Iowa and lubricated bushings from the OIL LITE CO. of Chicago.

Figure 3:
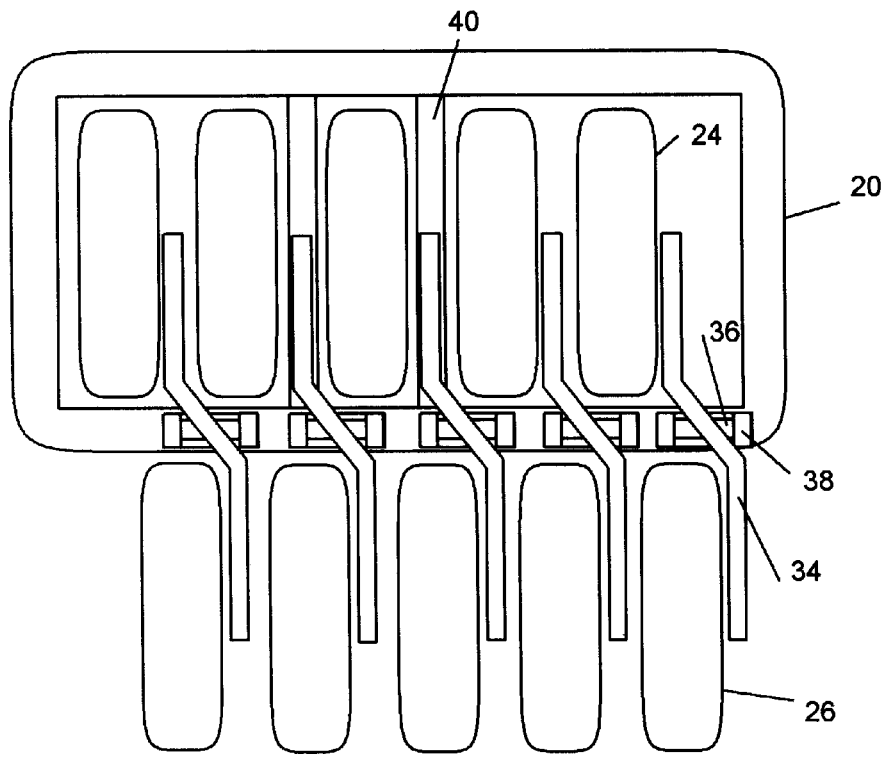
FIG. 3 schematically illustrates a bottom plan view of a roller assembly.
Figure 4:
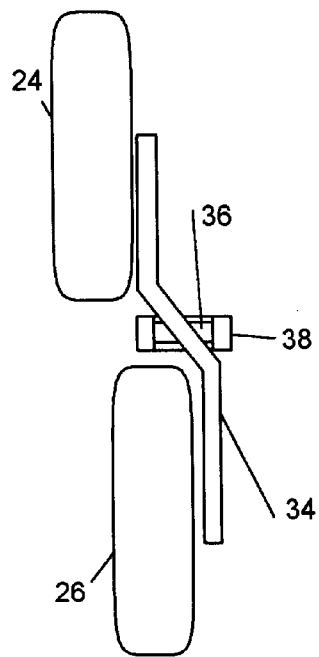
FIG. 4 schematically illustrates a bottom plan view of an individual walking beam roller pair.

As can be seen in FIGS. 2 through 4, the front roller members 24 and rear roller members 26 are mounted on opposite ends of walking beams 34. The walking beams 34 include pivot pins 36 that are pivotably secured to the frame member 20 by respective brackets 38. Although five pairs of front and rear roller members are illustrated, it is to be understood that any desirable number of pairs can be mounted in similar fashion. The frame member 20 can be provided with a generally rectangular cross-section, and can be fabricated from any suitable strong, rigid material, such as 12"×6"×0.25" steel tubing. A pair of reinforcing beams 40 can be provided on the frame member 20. The reinforcing beams 22 serve to add strength and stiffness to the frame member 20.

Figure 5:
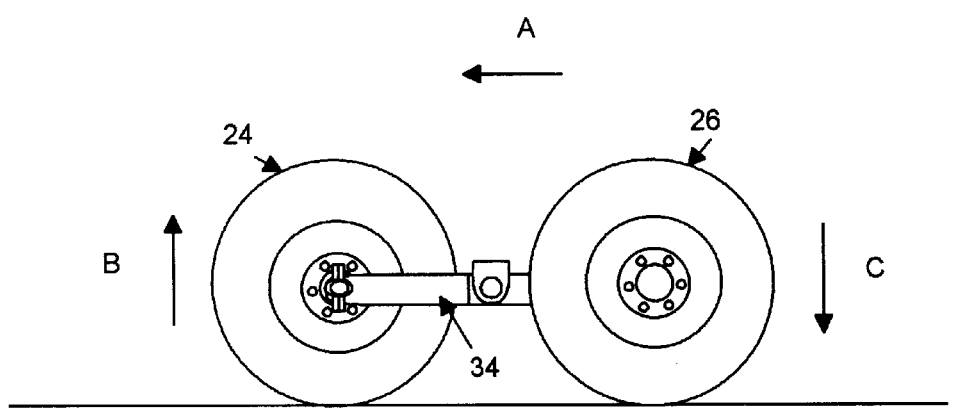
FIG. 5 schematically illustrates a side elevational view of an individual walking beam roller pair.

As illustrated in FIG. 5, the provision of the walking beams 34 enables the roller assembly 10 to more readily handle irregular or uneven road surfaces. For example, if the roller assembly traveling in the direction of arrow A encounters a portion of the roadbed that exerts a force in the direction of arrow A, upward movement of the roller member 24 is limited by the contact between the roller member 26 and the road surface, as translated to the roller member 24 through the walking beam 34. This results in a much smoother and more uniform paving surface.

While details of the invention are discussed herein with reference to some specific examples to which the principles of the present invention can be applied, the applicability of the invention to other devices and equivalent components thereof will become readily apparent to those of skill in the art.

Accordingly, it is intended that all such alternatives, modifications, permutations, and variations to the exemplary embodiments can be made without departing from the scope and spirit of the present invention as set forth in the appended claims.

We claim:

1. A roller assembly comprising the following:
   a frame member;
   a plurality of front roller members;
   a plurality of rear roller members corresponding in number to the plurality of front roller members; and
   a plurality of walking beams pivotably connected to the frame member at respective pivot points, each of the walking beams connecting one of the front roller members with a respective one of the rear roller members such that the pivot points of the respective walking beams are between the respective front and rear roller members.

2. A roller assembly according to claim 1, wherein the front roller members and the rear roller members have respective radial axes, and the front and rear roller members are mounted on the walking beams such that the radial axes of the front roller members are offset from the radial axes of the rear roller members.

3. A roller assembly according to claim 1, wherein the frame member comprises a generally rectangular outer frame.

4. A roller assembly according to claim 3, wherein the generally rectangular outer frame of the frame member is fabricated from tubular steel.

5. A roller assembly according to claim 1, further comprising an attachment mechanism secured to the frame member, the attachment mechanism being adapted and constructed to facilitate attachment of the roller assembly to a tow vehicle.

6. A roller assembly according to claim 5, further comprising a hitch mechanism secured to the frame member, the hitch mechanism being adapted and constructed to facilitate attachment of the roller assembly to a second vehicle.

7. A roller assembly according to claim 6, wherein the attachment mechanism and the hitch mechanism are secured on opposite sides of the frame member.

8. A roller assembly according to claim 1, wherein the front roller members and the rear roller members comprise wheel and tire assemblies.

9. A roller assembly according to claim 8, wherein the wheel and tire assemblies are secured to the walking beams by lubricated bushings.

10. A roller assembly according to claim 1, further comprising at least one reinforcing beam secured to the frame member.

11. A roller assembly according to claim 10, wherein the at least one reinforcing beam comprises a pair of parallel reinforcing beams secured at a central portion of the frame member.

12. A roller assembly according to claim 11, wherein at least one of the roller members is mounted between the reinforcing beams.

13. A roller assembly according to claim 1, further comprising a pair of parallel reinforcing beams secured at a central portion of the frame member, whereby at least one of the front roller members is mounted between the reinforcing beams.

14. A roller assembly for compacting road surfaces during paving operations, the roller assembly comprising the following:
   a generally rectangular steel frame member;
   five front roller members;
   five rear roller members; and
   five walking beams pivotably connected to the frame member at respective pivot points, each of the walking beams connecting one of the front roller members with a respective one of the rear roller members such that the pivot points of the respective walking beams are between the respective front and rear roller members.

15. A roller assembly according to claim 14, wherein the front roller members and the rear roller members have respective radial axes, and the front and rear roller members are mounted on the walking beams such that the radial axes of the front roller members are offset from the radial axes of the rear roller members.

16. A roller assembly according to claim 15, further comprising an attachment mechanism secured to the frame member, the attachment mechanism being adapted and constructed to facilitate attachment of the roller assembly to a tow vehicle.

17. A roller assembly according to claim 16, further comprising a hitch mechanism secured to the frame member, the hitch mechanism being adapted and constructed to facilitate attachment of the roller assembly to a second vehicle.

18. A roller assembly according to claim 10, wherein the attachment mechanism and the hitch mechanism are secured on opposite sides of the frame member.

19. A roller assembly according to claim 14, wherein the front roller members and the rear roller members comprise wheel and tire assemblies, and the wheel and tire assemblies are secured to the walking beams by lubricated bushings.

20. A method of compacting paving material distributed on a road surface, the method comprising the following steps:

provided a roller assembly comprising a frame member, a plurality of front roller members, a plurality of rear roller members corresponding in number to the plurality of front roller members, and a plurality of walking beams pivotably connected to the frame member at respective pivot points, each of the walking beams connecting one of the front roller members with a respective one of the rear roller members such that the pivot points of the respective walking beams are between the respective front and rear roller members;

connecting the roller assembly to a tow vehicle; and towing the roller assembly over the paving material.

\* \* \* \* \*

UNITED STATES PATENT AND TRADEMARK OFFICE
CERTIFICATE OF CORRECTION

PATENT NO. : 6,520,717 B1 Page 1 of 1
DATED : February 18, 2003
INVENTOR(S) : Alan Otto It is certified that error appears in the above-identified patent and that said Letters Patent is hereby corrected as shown below:

Column 5,
Line 13, "according to claim 10" should be -- according to claim 17 --.

Signed and Sealed this

Eighth Day of July, 2003

JAMES E. ROGAN
*Director of the United States Patent and Trademark Office*

(12) EX PARTE REEXAMINATION CERTIFICATE (6843rd)
United States Patent
Otto et al.

(10) Number: US 6,520,717 C1
(45) Certificate Issued: May 26, 2009

(54) WALKING BEAM ROLLER APPARATUS

(75) Inventors: Allan Otto, Big Sandy, MT (US); Jerry Otto, Havre, MT (US)

(73) Assignee: O & L Corporation, Billings, MT (US)

Reexamination Request:
No. 90/008,566, Apr. 2, 2007

Reexamination Certificate for:
Patent No.: 6,520,717
Issued: Feb. 18, 2003
Appl. No.: 09/287,968
Filed: Apr. 7, 1999

Certificate of Correction issued Jul. 8, 2003.

(51) Int. Cl.
*E01C 19/23* (2006.01)

(52) U.S. Cl. .................... 404/122; 404/132
(58) Field of Classification Search .......... 404/122, 404/128, 132
See application file for complete search history.

(56) References Cited

U.S. PATENT DOCUMENTS

| | | | |
|---|---|---|---|
| 1,804,862 A | | 5/1931 | Duncan |
| 3,993,413 A | * | 11/1976 | Cox et al. .............. 404/128 |
| 4,333,665 A | | 6/1982 | Haddock |
| 4,438,819 A | | 3/1984 | Ryals |
| 5,215,150 A | | 6/1993 | Wilkins |
| 5,738,379 A | | 4/1998 | Floe |
| 5,896,820 A | | 4/1999 | Klinkner |
| 6,206,106 B1 | | 3/2001 | Heckendorf |

* cited by examiner

*Primary Examiner*—Jimmy G Foster

(57) ABSTRACT

A roller assembly including a frame member, a plurality of front roller members, and plurality of rear roller members corresponding in number to the plurality of front roller members is described. A plurality of walking beams are pivotably connected to the frame member. Each of the walking beams connects one of the front roller members with a respective one of the rear roller members. The front roller members and the rear roller members have respective radial axes. The front and rear roller members are mounted on the walking beams such that the radial axes of the front roller members are offset from the radial axes of the rear roller members. The frame member can include a generally rectangular outer frame, which can be fabricated from tubular steel. An attachment mechanism can be secured to the frame member to facilitate attachment of the roller assembly to an operating tow vehicle. A hitch mechanism can be secured to the frame member to facilitate attachment of the roller assembly to a second vehicle. The attachment mechanism and the hitch mechanism can be secured on opposite sides of the frame member. The front roller members and the rear roller members can be provided as wheel and tire assemblies mounted to the walking beams by means of lubricated bushings. At least one reinforcing beam can be secured to the frame member. In an embodiment, a pair of parallel reinforcing beams are secured at a central portion of the frame member. At least one of the roller members can be mounted between the reinforcing beams.

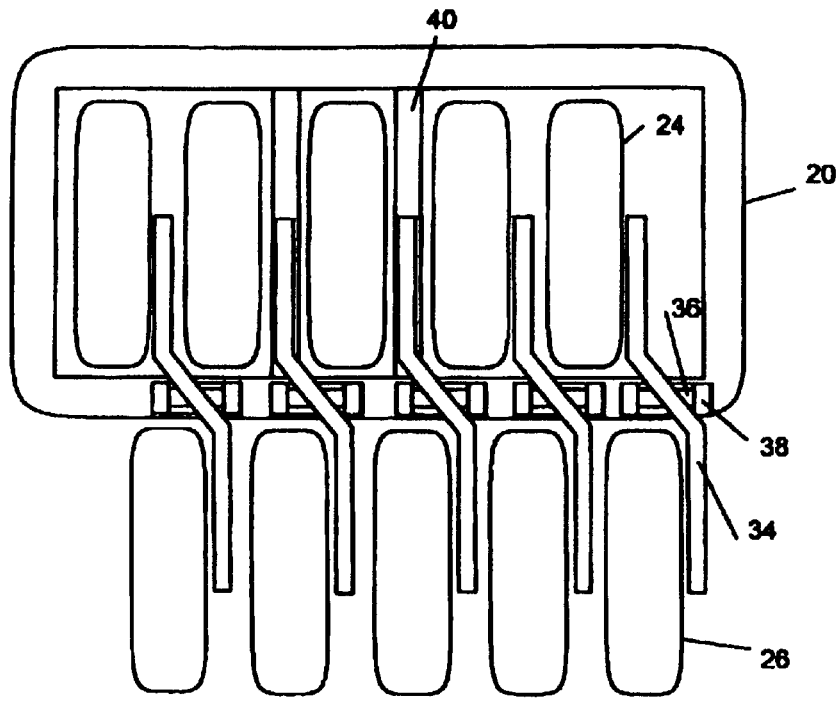

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 14–19 is confirmed.

Claims 1–13 and 20 are cancelled.

\* \* \* \* \*